Feb. 6, 1940.                L. T. BOURLAND                2,189,623
                    INTEGRATING X-RAY DOSAGE METERS
                         Filed June 28, 1938
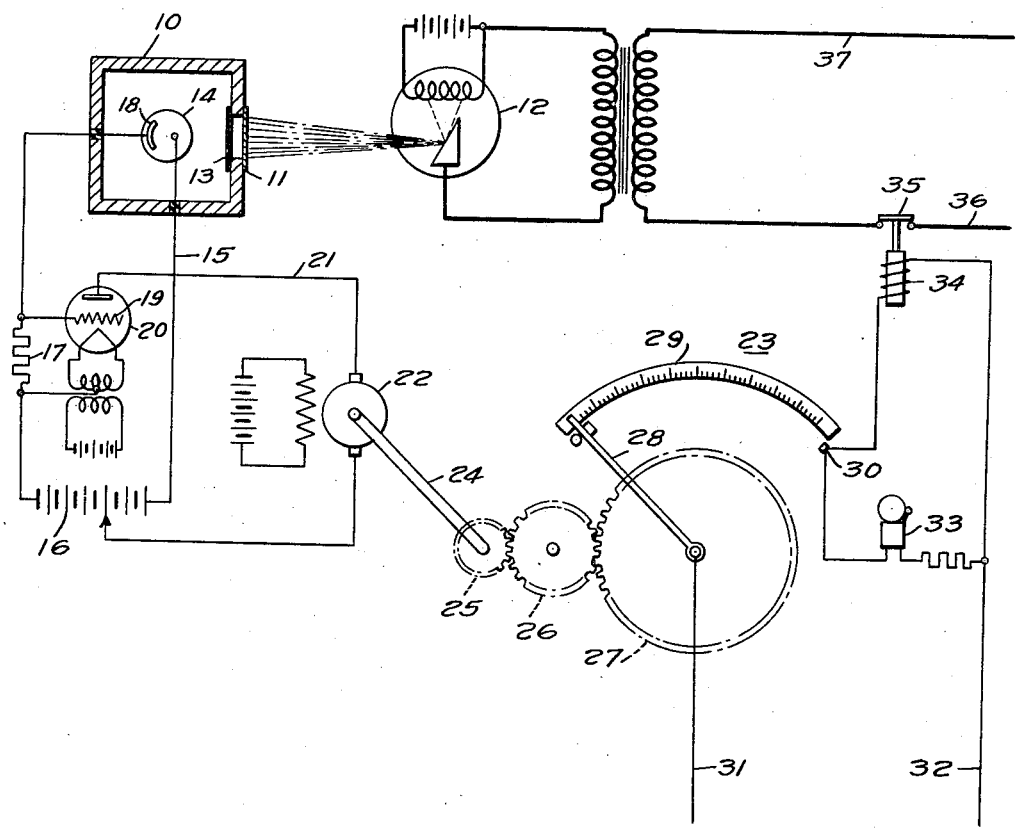
WITNESSES:
E. A. McCloskey.
R. W. Bailey
INVENTOR
Longford T. Bourland.
BY F. W. Lyle.
ATTORNEY Patented Feb. 6, 1940

2,189,623

UNITED STATES PATENT OFFICE 2,189,623

INTEGRATING X-RAY DOSAGE METERS

Langford T. Bourland, Forest Hills, Pa., assignor to Westinghouse Electric & Manufacturing Company, East Pittsburgh, Pa., a corporation of Pennsylvania Application June 28, 1938, Serial No. 216,235

1 Claim. (Cl. 250—83)

My invention relates to devices responsive to invisible radiation and especially to such a device measuring the dosage of X-ray treatment.

An object of the invention is to provide mechanism responsive to the direct invisible radiation only of a particular device.

Another object of the invention is to provide a device which will automatically operate the motor of an indicating device to make the desired indication or interruption when the dosage has reached the desired amount of treatment.

Other objects and advantages of the invention will be apparent from the following description and drawing, in which the figure is a diagrammatic circuit illustrating a preferred embodiment of the invention.

In clinical X-ray therapy, it is important to measure the total dosage of the radiation applied to the patient. If the average intensity of the radiation within the zone of treatment be a known constant quantity, the dosage may be calculated by multiplying this intensity by the total time of treatment. However, it is difficult to predict the average intensity with certainty due to the effect of variation in X-ray tube current, voltage and efficiency, and the effect of changes in the positions of patient or filter during the treatment.

My invention concerns an instrument which automatically integrates the X-ray dosage and accordingly eliminates the uncertainty of calculating the dosage and accordingly provides a means for avoiding injury due to excessive exposure to the radiation. Prior art devices have been constructed which make use of the ionization of air traversed by the radiation. An important operating disadvantage of this type of instrument lies in the necessity for maintaining a high degree of electrical insulation to prevent the minute electrical charges accumulated by a collection of the products of ionization from leaking off before actuating the integrating mechanism. The stringent conditions of cleanliness and humidity necessary to maintain satisfactory operation prove difficult to meet in the physician's office.

Furthermore, the invisible radiations, such as X-rays may strike an object adjacent to the measuring device and the secondary emission from such an object, may make the measuring device given an incorrect result as to the strength of the dosage.

To overcome these difficulties, I provide a container 10, which is opaque to visible radiations, and has the major portion composed of a substance, such as lead, which is substantially opaque to invisible radiation. In this lead container is a window 11 of aluminum which is permeable by the X-rays or other invisible radiation which may be supplied by a device diagrammatically illustrated at 12. Within the container 10, I locate adjacent the aluminum window a substance 13 that will be fluorescent to the invisible radiation impinging thereon. This substance may be calcium tungstate or barium platinocyanide or potassium uranyl sulphate on cellulose acetate, or any other suitable fluorescent material. If it is desired to measure the amount of invisible radiation of a particular range of wave length, a suitable filter may be placed between the aluminum window 11 and the fluorescent substance 13. The container 10 may be sealed air-tight to prevent any variation because of atmospheric humidity pressure or state of cleanliness. Within the container 10 and adjacent the fluorescent substance 13 is a photosensitive device 14. This device may be of various forms, but I prefer to utilize the photo-tube form illustrated in the drawing. This photo-tube has an anode circuit 15 leading to a source of potential 16, and has the return circuit 17 to the cathode 18 of the photo-tube. The cathode circuit is connected to the grid 19 of the electric valve 20. This valve or tube is preferably of the vacuum type and is energized from the source of potential 16. The anode circuit 21 is connected to a motor 22, preferably of very small size. The constants of the tube and motor circuits are selected to give the motor a speed proportional to the intensity of radiation received directly from the device 12 on the fluorescent screen 13. The motor is connected to an indicating device 23. The connection between the motor and the indicating device is preferably through a shaft 24 and a set of reducing gears 25, 26 and 27. The last gear 27 in this train moves a pointer 28 across the scale 29. This pointer 28 is also preferably operated to make contact at 30 to complete the electric circuit of 31 and 32. An audible indicating device, such as a bell 33, may be operated by the contact of 28 with the contact 30. Likewise, the making of this contact can operate a relay coil 34 to break the contact 35 in the electrical supply source 36 and 37, for the X-ray tube 12.

Various other modifications may, of course, be made in the particular indicating device, depending upon the desired signal or operation desired when the dosage has reached the quantity desired.

It will be noted that the contents of container 10 will respond only to the invisible radiations from the particular device 12 and accordingly, a plurality of these devices may be placed in operation at the same time if care is taken that the radiations from one X-ray device do not impinge upon the aluminum window of a container associated with another X-ray tube. Likewise, the secondary emission emitted by certain objects under the influence of the invisible radiation will not affect the measuring mechanism. The photo-sensitive device 14 will respond in accordance with the amount of fluorescence of the substance 13, which, in turn, will depend upon the amount of radiation received from the X-ray tube 12. This response of the photo-sensitive device 14 will, in turn, operate the motor 22 at a speed proportional to the intensity of radiation from 12, so that the deflection of the indicating device 23 is made proportional to the amount of dosage.

Various modifications may, of course, be made in the form, arrangement and number of the elements illustrated. A copper-oxide photo-sensitive device may be substituted for that of the photo-tube 14 and more than one stage of amplification of the output of the photo-sensitive device may be made as examples of such variation. Accordingly, I desire only such limitations on the following claim as are necessitated by the prior art.

I claim as my invention:

In combination, a source of invisible radiations with electric supply connections thereto and a device responsive to said invisible radiations comprising a container opaque to visible radiations, a substance therein fluorescent to invisible radiation, a photo-sensitive device within said container actuated by the fluorescence of said substance, a motor actuated by said photo-sensitive device and means, actuated by said motor, for interrupting the electric supply connections of said source of invisible radiations.

LANGFORD T. BOURLAND.